(12) United States Patent
Gieras

(10) Patent No.: US 10,749,390 B2
(45) Date of Patent: Aug. 18, 2020

(54) LINE-START SYNCHRONOUS RELUCTANCE MOTOR WITH IMPROVED PERFORMANCE

(71) Applicant: Hamilton Sundstrand Corporation, Charlotte, NC (US)

(72) Inventor: Jacek F. Gieras, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 467 days.

(21) Appl. No.: 15/400,531

(22) Filed: Jan. 6, 2017

(65) Prior Publication Data
US 2018/0198356 A1 Jul. 12, 2018

(51) Int. Cl.
*H02K 1/24* (2006.01)
*H02K 19/14* (2006.01)

(52) U.S. Cl.
CPC ............ *H02K 1/246* (2013.01); *H02K 19/14* (2013.01); *H02K 2213/03* (2013.01)

(58) Field of Classification Search
CPC ...... H02K 1/223; H02K 1/226; H02K 21/048; H02K 15/02; H02K 15/03; H02K 21/04; H02K 21/042; H02K 21/044; H02K 21/046; H02K 19/02; H02K 19/16; H02K 2201/12; H02K 21/12; H02K 21/30; H02K 21/46
USPC .......... 310/156.78, 156.83, 156.84, 162, 211
See application file for complete search history.

(56) References Cited

U.S. PATENT DOCUMENTS

| 4,139,790 | A |   | 2/1979  | Steen |
|-----------|---|---|---------|-------|
| 4,405,873 | A |   | 9/1983  | Nondahl |
| 4,568,846 | A | * | 2/1986  | Kapadia ................. H02K 21/46 310/156.83 |
| 5,097,166 | A |   | 3/1992  | Mikulic |
| 5,296,773 | A |   | 3/1994  | El-Antably |
| 5,818,140 | A |   | 10/1998 | Vagati |
| 5,831,367 | A |   | 11/1998 | Fei |
| 6,844,652 | B1 |  | 1/2005  | Chu |
| 2006/0108888 | A1 | * | 5/2006 | Jung ...................... H02K 1/246 310/211 |
| 2010/0011806 | A1 | * | 1/2010 | Nam .................... F04C 18/3564 62/510 |
| 2010/0148613 | A1 | * | 6/2010 | Nam ...................... H02K 19/14 310/156.83 |

OTHER PUBLICATIONS

Popescu, M., et al., "Line-start PM motor: single-phase starting performance analysis," IEEE Transactions on Industry Applications, vol. 39, No. 4, Jul./Aug. 2003, pp. 1021-1030.

* cited by examiner

*Primary Examiner* — Nguyen Tran
(74) *Attorney, Agent, or Firm* — Cantor Colburn LLP

(57) ABSTRACT

A line start synchronous-reluctance (LSSRM) brushless motor includes a stator that is arranged at an inner circumferential surface of a motor body and that extends longitudinally along an axis to define a central opening. A rotor assembly is disposed in the central opening. The rotor assembly includes a rotor that is configured to rotate via a shaft, and that is surrounded by the stator to define an air gap between an outer edge of the rotor and the stator. The rotor assembly further includes a plurality rotor slots arranged along the circumference of the outer edge, and at least one magnetic flux barrier aligned with a group of opposing rotor slots.

16 Claims, 3 Drawing Sheets

LINE-START SYNCHRONOUS RELUCTANCE MOTOR WITH IMPROVED PERFORMANCE

BACKGROUND

Generally, because a permanent magnet (PM) synchronous motor is not self-starting, implementations of PM synchronous motors can include a frequency-change starting method using a variable-voltage variable-frequency (VVVF) solid-state inverter. When the speed control is not required, a rotor cage winding method can be more cost-effective solution to starting the PM synchronous motor because the VVVF solid-state inverter is not necessary. A rotor cage winding method equips the PM rotor with a cage winding to provide asynchronous starting and operation without the use of solid state converters.

A PM synchronous motor with asynchronous starting is sometimes referred to as a line start permanent magnet (LSPM) brushless motor. The LSPM brushless motor employs one or more permanent magnets (PMs) such that the interaction of the stator rotating magnetic field and the rotor currents induced in the single-cage winding produces a starting torque that rotates the rotor. After rotation is initiated, the rotor is pulled into synchronism and rotates with the speed imposed by the line input frequency. The efficiency of line start PM motors is higher than that of equivalent induction motors and the power factor can be equal to unity. Although a LSPM brushless motor does not require solid state converters, conventional line start LSPM motors rated at about 10 kW and above, may draw unacceptable high inrush current exceeding several times the rated current. For instance, a high starting current in the range of approximately 4 to 8 times higher than the rated current, for example, is typically necessary to generate the starting torque. In addition, the PMs included in the rotor assembly increases costs and the overall weight of the motor.

BRIEF DESCRIPTION

According to a non-limiting embodiment, a line start synchronous-reluctance (LSSRM) brushless motor includes a stator arranged at an inner circumferential surface of a motor body and extending longitudinally along an axis to define a central opening. A rotor assembly is disposed in the central opening. The rotor assembly includes a rotor that is configured to rotate via a shaft, and that is surrounded by the stator to define an air gap between an outer edge of the rotor and the stator. The rotor assembly further includes a plurality rotor slots arranged along the circumference of the outer edge, and at least one magnetic flux barrier aligned with a group of opposing rotor slots.

According to another non-limiting embodiment, a rotor assembly comprise a rotor that is configured to rotate via a shaft, and that is surrounded by a stator to define an air gap between an outer edge of the rotor and the stator. A plurality rotor slots are arranged along the circumference of the outer edge. At least one magnetic flux barrier is aligned with a group of opposing rotor slots, wherein the at least one magnetic flux barrier per pole pair is a void formed in the rotor, the void extending between the first rotor slot and the second rotor slot.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Conventional line start synchronous motors employ a cage winding in the rotor to produce asynchronous starting torque for inducing start-up. As the speed of the rotor nears the synchronous speed, the rotor is pulled into synchronism. The synchronous speed ($n_s$) of a given synchronous-reluctance motor is typically defined as $n_s$=f/p, where f is the line frequency and p is the number pole pairs included in the rotor assembly.

One of disadvantages of conventional line start synchronous motors are their susceptibility to parasitical higher-harmonic braking torques. These parasitical higher-harmonic braking torques are produced by an interaction between the cage winding the rotating magnetic field when the speed is: (a) close to the synchronous speed and (b) at the synchronous speed. Various non-limiting embodiments of the disclosure provide a LSSRM brushless motor including a rotor assembly having flux barriers that overcome the parasitical higher-harmonic braking torques produced by the cage winding. The leakage reactance of the cage rotor winding depends on the slip. The slip, s=1 at rotational starting, means that the frequency of currents in the rotor is high and equal to the stator frequency f. For high frequency, the rotor current is generated mainly in the high-resistance and high-inductance upper cage, which reduces the starting current. As the speed increases, the slip decreases and the frequency in the rotor (sf) becomes very low. If the rotor approaches synchronism with the stator magnetic field, the slip may reach a value of s=0.02, for example, and if the stator frequency is about 60 Hz, for example, the rotor frequency (sf) may be defined as, sf=0.02×60=1.2 Hz. The term "about" is intended to include the degree of error associated with measurement of the particular quantity based upon the equipment available at the time of filing the application. For example, "about" can include a range of ±8% or 5%, or 2% of a given value.

Figure 1:
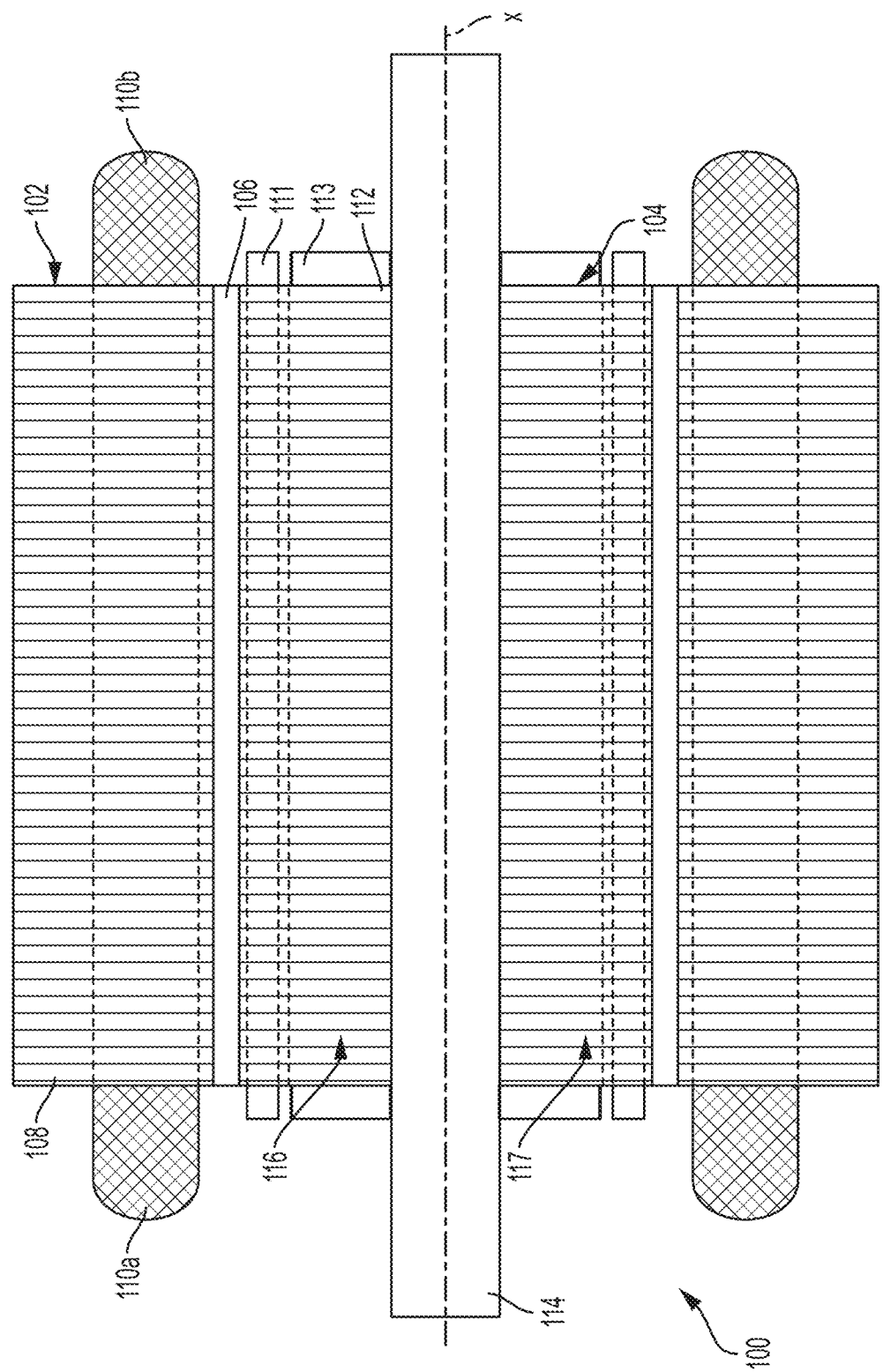
FIG. 1 is a longitudinal section view of line start synchronous-reluctance (LSSRM) brushless motor including a rotor assembly according to a non-limiting embodiment.

Turning now to FIG. 1, a line start permanent magnet (LSSRM) brushless motor 100 is illustrated according to a non-limiting embodiment. The LSSRM brushless motor 100 includes a stator 102 and a rotor assembly 104 having a plurality of cage windings that rotate with respect to the stator 102. The stator 102 has a concentric housing that extends longitudinally along an axis (X) and defines central opening 106. The central opening 106 is configured to receive the rotor assembly 104 so as to define an air gap (See FIGS. 2 and 3) therebetween. The stator 102 further includes a stator yoke 108. The stator 102 includes winding slots (see FIGS. 2 and 3) that extend radially with respect to axis (X). The stator 102 may be constructed according to well-known stator designs and is configured to be energized by placing an alternating current voltage across the windings, including the end turns 110a-110b.

The rotor assembly 104 includes a rotor 112 with a ferromagnetic core that is rotatably mounted on a shaft 114 that extends longitudinally through the central opening 106 defined by the stator 102 and is configured to rotate about the axis (X). In this manner, the rotor 112 is configured to rotate with respect to the stator 102. The rotor assembly 104 may further includes a pair of upper end pieces 111 and a pair of lower end pieces 113 which abut opposite ends of the cage windings, respectively. The upper and lower end pieces 111-113 are axially spaced along the axis (X), and are formed of a magnetic conductor such as, for example, stainless steel.

Figure 2:
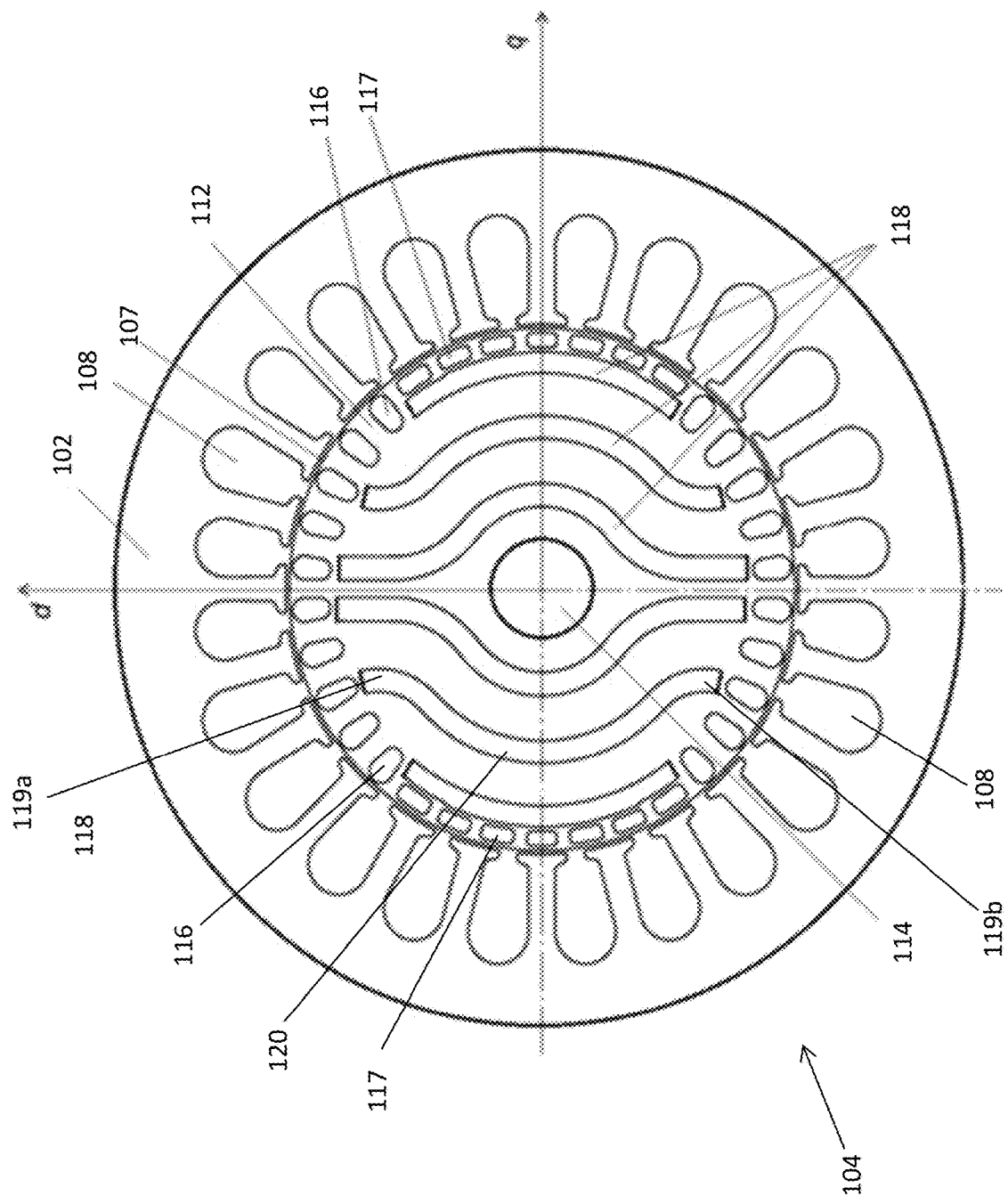
FIG. 2 is a plan end view of a two-pole LSSRM rotor assembly including flux barriers according to a non-limiting embodiment.

As further illustrated in FIG. 2, the rotor 112 includes a plurality of rotor slots 116-117 and a plurality of magnetic flux barriers 118. The rotor slots 116-117 are arranged along the circumference of an outer edge of the rotor 112 (i.e., directly next to the air gap 107). Although a two-pole arrangement is shown in FIG. 2, the rotor assembly 104 is not limited thereto. For example, the rotor assembly 104 may include four poles. The number of poles defines the electrical degrees of the motor 100. Electrical degrees may be defined as the "mechanical degree" times the number of pole pairs. In the case of a two pole-motor, for example, the electrical degree is the same as mechanical degree (one pole pair). In the case of a four pole LSSRM brushless motor, the electrical degree (i.e., 90°) of the motor 100 is twice the mechanical degree (i.e., 45°) due to the dual pair of pole pairs. Accordingly, the four-pole arrangement allows for a higher frequency The rotor slots 116-117 extend radially with respect to a first axis (d) to define a rotor slot depth and longitudinally along a second axis (q) to define a rotor slot width. It is preferred that the rotor assembly 112 include an even number of rotor slots 116-117; however, the rotor assembly 112 is not limited thereto may have an odd number of rotor slots 116-117.

The rotor assembly 104 includes a first set of rotor slots 116 and a second set of rotor slots 117. Each slot 116 includes in the first set has a depth (i.e., extending along the d-axis) that is greater than its width (i.e., extending along the q-axis). These rotor slots 116 are hereinafter referred to as d-slots 116. In at least one non-limiting embodiment, the depth of each d-slot 116 ranges from about 5 millimeters (mm) to about 40 mm, while the width of each d-slot 116 ranges from about 3 mm to about 20 mm. Each slot 117 in the second set has a width (i.e., extending along the q-axis) that is greater than its depth (i.e., extending along the d-axis). These rotor slots 117 are hereinafter referred to as q-slots 117. In at least one non-limiting embodiment, the depth of each q-slot 117 ranges from about 3 mm to about 15 mm, while the width of each q-slots 117 ranges from about 4 mm to about 25 mm. In at least one embodiment, the d-slot 116 have an oval shape, and elliptical shape, or a tear-drop shape, whereas the q-slots 117 have a square or rectangular shape.

The magnetic flux barriers 118 are defined by voids or an air space formed in the rotor 112. Although the rotor assembly is illustrated as having three flux barriers 118 per pole, the LSSRM motor 100 is not limited thereto. In at least one embodiment, the rotor assembly 104 includes one magnetic flux barrier per pole pair. The magnetic flux barriers 118 extend in d-axis direction between first and second opposing end. In at least one embodiment, one or more magnetic flux barriers 118 are aligned with a group of opposing d-slots. Accordingly, the d-slots 116 can serve as extensions of the magnetic flux barriers.

For instance, a magnetic flux barrier 118 has a first end 119a that is aligned with a first respective d-slot 116 arranged at a first portion of the rotor 112, and an opposing second end 119b that is aligned with a second respective d-slot 116 arranged at a second portion of the rotor 112 located opposite from the first portion. According to a non-limiting embodiment, the width (i.e., the space extending in the q-axis direction) of each magnetic flux barrier 118 ranges from about 2 mm to about 15 mm. In at least one non-limiting embodiment, the magnetic flux barriers 118 are arranged with respect to alternating groups of d-slots 116 as further illustrated in FIG. 2. The rotor assembly 112, however, is not limited to this alternating arrangement. In at least one embodiment, one or more of the magnetic flux barriers 118 include an arc-shaped portion. The arc-shaped portion 120 has a bending radius that greater than the shaft radius and less than the rotor radius. In at least one embodiment, the bending radius, or the total length of the arc-shaped portion 120, increases from the center of rotor near the shaft 114 to the air gap 107, while the angle of the arc decreases. That is, the total length of the arc-shaped portion 120 included in a first magnetic flux barrier 118 located directly next to the shaft 114 is less than the total length of the arc-shaped portion 120 included in a second magnetic flux barrier 118 located directly next to the air gap 107. However, the angle of the arc-shaped portion 120 included in the first magnetic flux barrier 118 located directly next to the shaft 114 is greater than the angle of the arc-shaped portion 120 included in the second magnetic flux barrier 118 located directly next to the air gap 107.

Figure 3:
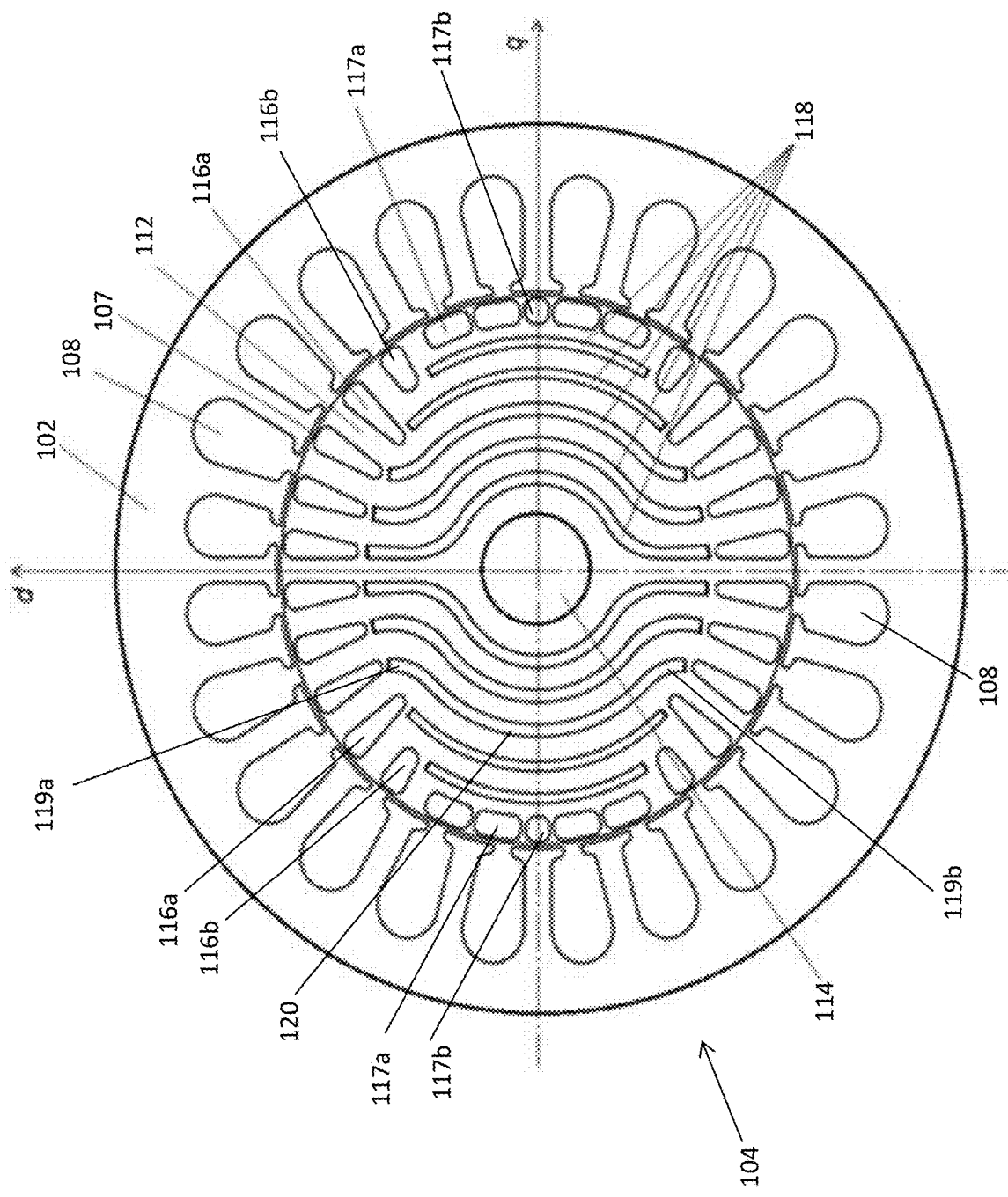
FIG. 3 is a plan end view of a two-pole LSSRM rotor assembly including flux barriers according to another non-limiting embodiment.

Turning to FIG. 3, a two-pole LSSRM rotor assembly 112 including five flux barriers 118 per pole is illustrated according to a non-limiting embodiment. The rotor assembly 112 illustrated in FIG. 3 is similar, to the rotor assembly illustrated in FIG. 2. The first set of rotor slots, however, includes a large d-slot 116a and a small d-slot 116b. In at least one embodiment the large d-slot 116a has first depth, while the small d-slot 116b has a second depth less than the first depth of the large d-slot 116a. The large d-slot 116a may have a tear-drop shape, while the small d-slot may have an oval shape. Similarly, the second set of slots includes a large q-slot 117a and a small q-slot 117b. In at least one embodiment, the large q-slot 117a has a first width, while the small q-slot 116b has a second width that is less than the first width. The large q-slot 117a may have a rectangular shape, while the small q-slot 117b may have a square or circular shape.

In at least one embodiment, a first large d-slot 116a is interposed between a second large d-slot 116a and small d-slot 116b, while the small d-slot is interposed between the first large d-slot 116a and a large q-slot 117a. A first large q-slot 117a can be interposed between a small d-slot 116b and a second large q-slot 117a. In at least one embodiment, a small q-slot 117b can be interposed between a first large q-slot 117a and a second large q-slot 117a.

Operation of a LSSRM brushless motor 100 that includes a rotor assembly 104 according to either embodiment illustrated in FIGS. 2-3 in essentially the same. For instance, in operation, and under all conditions of motor start-up, the stator 102 is energized which in turn induces currents in the cage windings of the rotor slots (slots 116-117 of FIG. 2 or slots 116a-116b and 117a-117b of FIG. 3). The resulting magnetic fields of generated by current flowing through the cage windings generates a torque forces which induces rotation of the rotor 112. Unlike conventional line start PM motors which require high starting current (e.g., approximately 4 to 8 times higher than the rated current) to induce rotation of the rotor, however, the cage winding of the rotor slots (slots 116-117 of FIG. 2 or slots 116a-116b and 117a-117b of FIG. 3) according to at least one non-limiting embodiment of the invention allows for startup of the rotor 104 using substantially less current (e.g., approximately 2 to 4 times higher than the rated current). That is, the cage winding of the rotor slots (slots 116-117 of FIG. 2 or slots 116a-116b and 117a-117b of FIG. 3) provide high starting torque ranging from, for example, approximately 1.5 to 3.5 times higher than the rated torque, at low starting current.

In addition, leakage reactance of the cage winding of the rotor slots 116 is controlled according to the slip (s) of the rotor 112. The slip (s) is typically referred to a condition where the rotor rotates at a speed less than synchronous speed. For example, a four-pole induction motor operating at 60 hertz (Hz), for example, has a synchronous speed of 1800 rotations per minute (rpm). The rotor, however, may have an actual speed of 1700 rpm. Such a condition is known as "slip" (s) and results in losses associated with induction type motors. Since these losses occur regardless of the operational speed of the motor, such losses are particularly undesirable if the motor runs for extended periods of time.

The technical effects and benefits of the line start synchronous-reluctance (LSSRM) brushless motor described herein include performance similar to conventional line start permanent magnet brushless motors, including excellent starting performance (i.e., the ability achieve high starting torque independent of rotor position), but without requiring the costly PMs. Omission of the PMs also reduces the overall weight of the motor. The LSSRM described herein also realizes little to no cogging torque, very low ripple, and no parasitic higher-harmonic breaking torques traditionally produced by the cage winding at synchronous speeds or near synchronous speeds. Accordingly, the LSSRM described herein is well-fitted for use in aerospace applications and aircraft systems including, but not limited to, fuel pump systems, HVAC systems, etc.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A line start synchronous-reluctance (LSSRM) brushless motor, comprising:
a stator arranged at an inner circumferential surface of a motor body and extending longitudinally along an axis to define a central opening; and
a rotor assembly disposed in the central opening, the rotor assembly comprising:
a rotor configured to rotate via a shaft, and surrounded by the stator to define an air gap between an outer edge of the rotor and the stator;
a plurality rotor slots arranged along the circumference of the outer edge, the rotor slots extending radially with respect to a first axis (d) to define a rotor slot depth and longitudinally along a second axis (q) to define a rotor slot width, the second axis (q) defining a lower half of the rotor and an upper half of the rotor opposite the lower half; and
a plurality of magnetic flux barriers aligned with a group of opposing rotor slots, at least one of magnetic flux barrier among the plurality of magnetic flux barriers continuously extending across the rotor from a first end of the at least one of magnetic flux barrier disposed in the lower half of the rotor to an opposing second end of the at least one of magnetic flux barrier disposed in the upper half of the rotor,
wherein the plurality of rotor slots includes a first set of rotor slots having first dimensions and a second set of rotor slots having second dimensions different from the first dimensions,
wherein the first set of rotor slots includes a plurality of large rotor slots having a first depth and a plurality of small rotor slots having a second depth that is less than the first depth, wherein a first small rotor slot is disposed directly next to a first end of the second set of rotor slots and a second small rotor slot is disposed directly next to a second end of the second set of rotor slots opposite the first end, and
wherein the second set of rotor slots includes a large rotor slot having a first width and a small rotor slot having a second width that is less than the first width, and wherein at least one of the at least one of magnetic flux barrier includes a semi-circle magnetic flux barrier disposed directly adjacent to the second set of rotor slots, the semi-circle magnetic flux barrier having a first end separated from the first set of rotor slots and below the first small rotor slot and having a second end separated from the first set of rotor slots and below the second small rotor slot.

2. The LSSRM of claim 1, wherein the at least one magnetic flux barrier per pole pair is a void formed in the rotor, the void extending between the first rotor slot and the second rotor slot.

3. The LSSRM of claim 2, wherein the at least one magnetic flux barrier per pole pair has a first end that is aligned with a first rotor slot arranged at a first portion of the rotor, and an opposing second end that is aligned with a second rotor slot arranged at a second portion of the rotor located opposite from the first portion.

4. The LSSRM of claim 3, wherein a width of each magnetic flux barrier ranges from about 2 mm to about 15 mm.

5. The LSSRM of claim 1, wherein each magnetic flux barrier included in the plurality of magnetic flux barriers is arranged with respect to alternating groups of rotating slots.

6. The LSSRM of claim 1, wherein each magnetic flux barrier included in the plurality of magnetic flux barriers is arranged with each group of rotating slots.

7. The LSSRM of claim 1, wherein the at least one magnetic flux barrier per pole pair includes an arc-shaped portion.

8. The LSSRM of claim 7, wherein the arc-shaped portion has a bending radius that greater than a shaft radius and less than a rotor radius of the rotor.

9. The LSSRM of claim 1, where each rotor slot included in the first set has a rotor slot width and rotor slot depth that is greater than the rotor slot width.

10. The LSSRM of claim 9, wherein each rotor slot in the second set has a rotor slot depth and a rotor slot width that is greater than the rotor slot depth.

11. The LSSRM of claim 10, wherein the rotor slots of the first set have an oval shape, an elliptical shape, or a tear-drop shape, and the rotor slots of the second set has a rectangular shape.

12. A rotor assembly, comprising:
a rotor configured to rotate via a shaft, and surrounded by a stator to define an air gap between an outer edge of the rotor and the stator;
a plurality rotor slots arranged along the circumference of the outer edge, the rotor slots extending radially with respect to a first axis (d) to define a rotor slot depth and longitudinally along a second axis (q) to define a rotor slot width, the second axis (q) defining a lower half of the rotor and an upper half of the rotor opposite the lower half; and
a plurality magnetic flux barriers aligned with a group of opposing rotor slots, at least one of magnetic flux barrier among the plurality of magnetic flux barriers continuously extending across the rotor from a first end of the at least one of magnetic flux barrier disposed in the lower half of the rotor to an opposing second end of the at least one of magnetic flux barrier disposed in the upper half of the rotor,
wherein the at least one magnetic flux barrier per pole pair is a void formed in the rotor, the void extending between the first rotor slot and the second rotor slot,
wherein the plurality of rotor slots includes a first set of rotor slots having first dimensions and a second set of rotor slots having second dimensions different from the first dimensions,
wherein the first set of rotor slots includes a plurality of large rotor slots having a first depth and a plurality of small rotor slots having a second depth that is less than the first depth, wherein a first small rotor slot is disposed directly next to a first end of the second set of rotor slots and a second small rotor slot is disposed directly next to a second end of the second set of rotor slots opposite the first end, and
wherein the second set of rotor slots includes a large rotor slot having a first width and a small rotor slot having a second width that is less than the first width, and wherein at least one of the at least one of magnetic flux barrier includes a semi-circle magnetic flux barrier disposed directly adjacent to the second set of rotor slots, the semi-circle magnetic flux barrier having a first end separated from the first set of rotor slots and below the first small rotor slot and having a second end separated from the first set of rotor slots and below the second small rotor slot.

13. The rotor assembly of claim 12, wherein the at least one magnetic flux barrier per pole pair has a first end that is aligned with a first rotor slot arranged at a first portion of the rotor, and an opposing second end that is aligned with a second rotor slot arranged at a second portion of the rotor located opposite from the first portion.

14. The rotor assembly of claim 13, further comprising a plurality of magnetic flux barriers.

15. The rotor assembly of claim 14, wherein each magnetic flux barrier included in the plurality of magnetic flux barriers is arranged with respect to alternating groups of rotating slots.

16. The rotor assembly of claim 14, wherein each magnetic flux barrier included in the plurality of magnetic flux barriers is arranged with each group of rotating slots.

* * * * *